US010121072B1

(12) United States Patent
Kekatpure

(10) Patent No.: US 10,121,072 B1
(45) Date of Patent: Nov. 6, 2018

(54) UNSUPERVISED REMOVAL OF TEXT FROM FORM IMAGES

(71) Applicant: INTUIT INC., Mountain View, CA (US)

(72) Inventor: Rohan Kekatpure, Mountain View, CA (US)

(73) Assignee: Intuit inc., Mountain View, CA (US)

( * ) Notice: Subject to any disclaimer, the term of this patent is extended or adjusted under 35 U.S.C. 154(b) by 108 days.

(21) Appl. No.: 15/395,728

(22) Filed: Dec. 30, 2016

(51) Int. Cl.
*G06K 9/00* (2006.01)
*G06F 17/24* (2006.01)
*G06K 9/46* (2006.01)

(52) U.S. Cl.
CPC ....... *G06K 9/00449* (2013.01); *G06F 17/248* (2013.01); *G06K 9/00463* (2013.01); *G06K 9/4652* (2013.01)

(58) Field of Classification Search
None
See application file for complete search history.

(56) References Cited

U.S. PATENT DOCUMENTS

| 2002/0102022 | A1* | 8/2002 | Ma | G06K 9/00456 382/170 |
| 2007/0201757 | A1* | 8/2007 | Madej | G06K 9/00456 382/254 |
| 2008/0050028 | A1* | 2/2008 | Kimura | H04N 19/63 382/238 |
| 2010/0259558 | A1* | 10/2010 | Oba | G06K 9/346 345/619 |
| 2010/0275018 | A1* | 10/2010 | Pedersen | G06T 19/00 713/168 |

* cited by examiner

*Primary Examiner* — Mark Roz
(74) *Attorney, Agent, or Firm* — Patterson & Sheridan LLP

(57) ABSTRACT

The present disclosure relates to language agnostic unsupervised removal of text from form images. According to one embodiment, a method comprises generating a spectral domain representation of an image by applying a two dimensional frequency domain transformation, where the image depicts form layout elements and text elements. Applying a first filter to the spectral domain representation to remove a portion of the frequency domain corresponding to the text element, and applying an inverse two dimensional frequency domain transformation to the filtered spectral domain representation of the image to generate a reconstructed image. The text elements are not depicted in the reconstructed image.

12 Claims, 8 Drawing Sheets

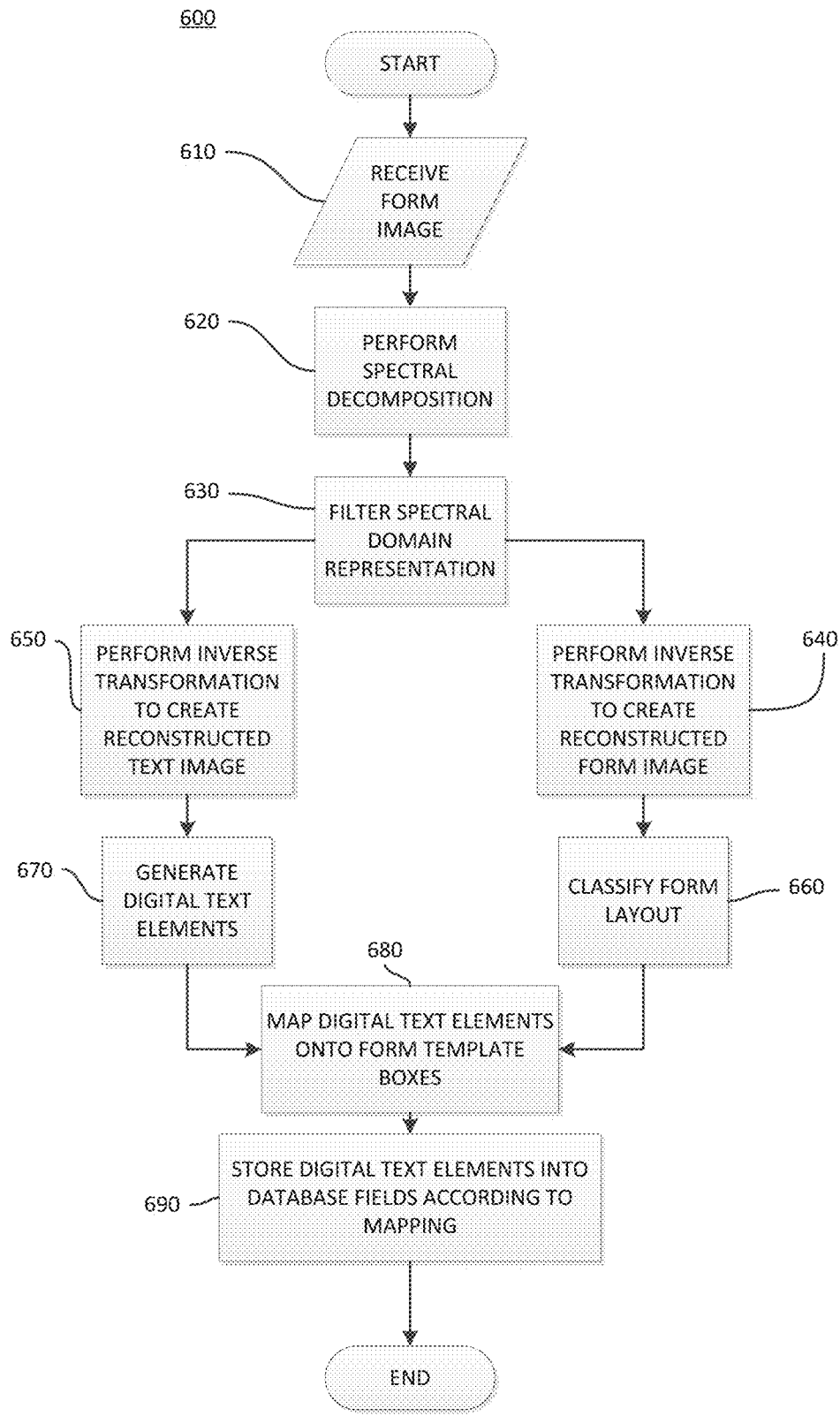

UNSUPERVISED REMOVAL OF TEXT FROM FORM IMAGES

BACKGROUND

Field

Embodiments presented herein generally relate to software applications that detect and remove certain text from images, and more specifically to an unsupervised machine-learning approach to removing text from images of form documents.

Description of the Related Art

Images of documents and text are common due to the ease of creating digital images. For example, images of completed form documents are generated when existing paper records are scanned or when an individual provides digital images of paper records in their possession. For example, users of tax- or accounting software applications (or online services) can generate images of forms by taking a picture of a document, such a W-2, with a digital camera. Images of form documents depict the information in that document using an image format, e.g., an array of pixel color values. Extracting text information from digital images in an electronic format is difficult.

One approach extracting data from images of forms is to classify images depicting a given form using neural networks and then extract the data from the form using optical character recognition over regions of the image. The neural networks currently in use for identifying a given form require significant amounts of training data to make accurate matches. Generating the training data set for a neural network is time intensive, costly, and presents a security risk when the documents contain sensitive personal information. For instance, training a neural network to identify W-2 forms issued by a variety of employers could expose the personal information in the W-2 forms to the human reviewers making the classifications for the training set. Further, neural networks are not easily scalable because they are not language agnostic, meaning that separate training sets are required for different languages.

The accuracy of the neural networks is also degraded by the presence of image specific text within the form layout, i.e., each person's social security number and wages will be different W-2 forms having identical form layout elements. The neural network classification can be improved when only the form layout is presented, but current methods for removing the text elements are costly or error prone. Similarly, extracting data present in the form image using optical character recognition is error prone when the optical character recognition is performed on an image having both form layout and text elements. High error rates in the accuracy of the extracted data require extensive quality control by human reviewers, or in some cases, may make the automatic extraction of the data values commercially impractical.

SUMMARY

One embodiment of the present disclosure includes a method for removing text from form images. The method generates a frequency domain representation of an image by applying a two dimensional frequency domain transformation, where the image depicts form layout and text elements. The method applies a filter to the frequency domain representation to remove a portion of the frequency domain corresponding to the text elements, and applies an inverse two dimensional (2D) frequency domain transformation to the filtered frequency domain representation of the image to generate a reconstructed image. The reconstructed image does not depict the text elements.

Another embodiment provides a computer-readable storage medium having instructions, which, when executed on a processor, operates to remove text from form images. The processor generates a frequency domain representation of an image by applying a 2D frequency domain transformation, where the image depicts form layout and text elements. The processor applies a filter to the frequency domain representation to remove a portion of the frequency domain corresponding to the text elements, and applies an inverse 2D frequency domain transformation to the filtered frequency domain representation of the image to generate a reconstructed image. The reconstructed image does not depict the text elements.

Still another embodiment of the present invention includes a processor and a memory storing a program, which, when executed on the processor, performs an operation for removing text from form images. The processor generates a frequency domain representation of an image by applying a 2D frequency domain transformation, where the image depicts form layout and text elements. The processor applies a filter to the frequency domain representation to remove a portion of the frequency domain corresponding to the text elements, and applies an inverse 2D frequency domain transformation to the filtered frequency domain representation of the image to generate a reconstructed image. The reconstructed image does not depict the text elements.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 6 is a flow chart illustrating a process for removing text from form images, according to one embodiment.

DETAILED DESCRIPTION

Figure 1:
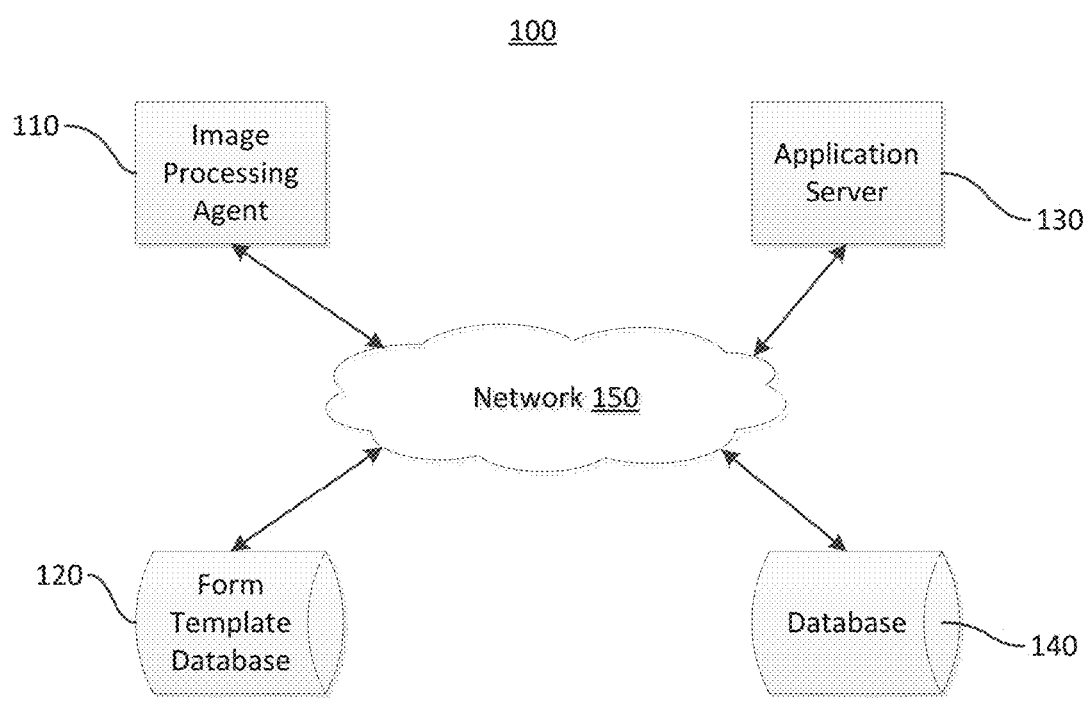
FIG. 1 illustrates an example system, according to one embodiment.

Generally, extracting and classifying text and data from digital images is required before such images can be used by other computing processes. Although humans can classify data and enter values into a database, human review (i.e., data entry) is often a slow and costly process that introduces a substantial time delay between receiving data and its availability to the rest of the system. Human review can also pose a security risk because it exposes data to the individuals performing the review. Attempts to automate data extraction and classification from images rely on neural networks, and have had some success. Neural networks, however, require large amounts of training data that must be classified by humans, meaning that the large time and cost overhead persists as a prerequisite to bringing the new classification system online.

Embodiments presented herein provide a system for automatically removing text from form images without requiring any training data. That is, the approach herein uses an unsupervised learning approach to separating text from form layout and presentation elements. Once separated, the form layout and text can be processed independently. In one embodiment, the system applies a spectral decomposition, i.e., a decomposition based on frequency, to an image, to create a representation of the image elements using a group of frequencies. The system filters the frequencies from the decomposed image to remove text content while retaining the layout elements of the image.

To apply the spectral decomposition, the system treats the 2D array pixels of the image as an array of signals, where each row and each column represent a separate signal. The system assigns a frequency to each signal based on the changing pixel colors, i.e., changing from black to white. For example, a ten pixel row of "1100110011" representing white and black pixels as 0 and 1, respectively, has four changes, while "1111100000" has only one. Thus, the first ten pixel row of the example changes color more often resulting in a higher frequency then the second row.

Form content, such as text, tends to be tightly grouped with high frequency variations between white spaces between and within the characters and the dark elements defining the characters. In contrast, layout elements of the form, i.e., lines and boxes, represent relatively low frequency variations. In one embodiment, the form processing application applies a spectral decomposition of the image using a 2D discrete Fourier transform (DFT) to produce a spectral domain representation of the image. That is, the spectral decomposition represents creates a spectral or frequency domain representation of the image as by analyzing the image as a series of signals whose frequencies are represented by the changes in color present in the rows and columns of pixels in the image. The system filters the spectral domain image to remove high frequency elements presumed to depict text within the image of the form. The low frequency elements presumed to depict the layout elements of the form remain in the spectral domain image. The system applies an inverse 2D DFT to the filtered spectral domain representation to create a reconstructed image that includes the form layout represented by the low frequency elements but not text elements represented by the high frequency components.

Similarly, high frequency components removed from the spectral domain image can be used to reconstruct an image containing the text elements without the layout elements shown in the image. The system uses the reconstructed form image (without the text) to identify the form, e.g., as matching a known form template. Further, the system can processes text from the reconstructed text image using an OCR agent. Once the form image is matched to a template, the system can map the text data into fields of a database. For example, a text value "10,000" extracted from a W-2 does not, by itself, provide enough context to know what the 10,000 represents. Mapping the extracted value to a field in the known template provides the necessary context because it locates the text in the area for taxable wages or federal tax withholding, for example. In the case where the reconstructed form does not match any of the known form templates, i.e., the system has not encountered this form layout before, the reconstructed form can be reviewed by a human without representing a security risk because text elements containing sensitive personal information have been removed.

Note embodiments described herein use tax forms, such as a W-2, as a reference example of forms having both layout elements and text elements. Of course, one of ordinary skill in the art will recognize that embodiments presented herein using these examples may be adapted for a broad variety of form content or form types.

FIG. 1 illustrates an example system 100, according to one embodiment. As shown, system 100 includes an image processing agent 110, a form template database 120, an application server 130, and a database 140, which communicate over network 150. Image processing agent 110 is configured to receive images from application server 130, database 140, or from a third party through network 150. The images generally include images of a given form which depict both text related to an instance of the form and the layout of the form itself, i.e., a completed tax form or another application. Image processing agent 110 extracts and classifies the data contained in the image by removing text from the image to create a form layout image and a text image.

Figure 2:
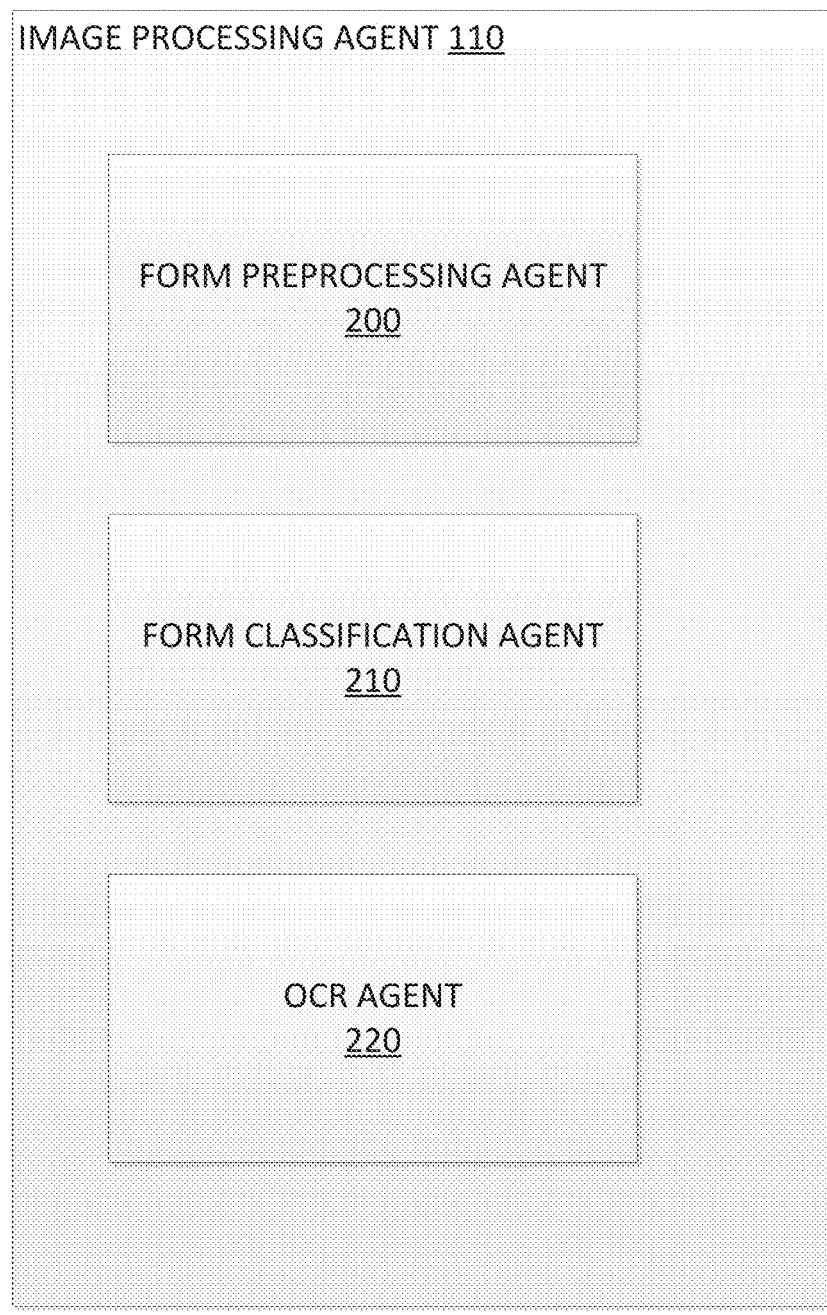
FIG. 2 is a block diagram illustrates an example image processing agent, according to one embodiment.

FIG. 2 illustrates an example image processing agent, according to one embodiment. Image processing agent 110 includes a form preprocessing agent 200, a form classification agent 210, and an OCR agent 220. Form preprocessing agent 200 receives an image from a user or another application through network 150. For example, a user submits an image of W-2 provided by his employer. Once received, the form preprocessing agent 200 separates the text elements from the form layout elements. That is, the form preprocessing agent 200 generates an image of the form in a "blank" or unused state that is used for more accurate matching with form templates. Form preprocessing agent 200 generates a separate image of the text elements without the form layout element that is used for more accurate text data extraction.

For example, the form preprocessing agent 200 may determine a 2D DFT of the image, resulting in a spectral domain representation. Generally, a DFT transformation represents a signal as a frequency spectrum that can be modified using high-pass, low-pass, or band-pass filters. Form preprocessing agent 200 analyzes the image as a 2D spatial-domain signal, i.e., in X-Y coordinates treating the X-axis as a first spatial-domain signal and the Y-axis as a second spatial domain signal. Each row of pixels on the X-axis is treated as a signal whose frequency varies according to the number of variation in pixel color. Similarly, each column of pixels on the Y-axis is also treated as a frequency varying with the number of pixel color changes. The layout elements of forms tend to be continuous lines in either the X or Y directions that will have little or no color variation in the axis parallel to the line. Text elements, however, tend to have frequent color changes due the densely grouped and individually defined characters. For example, line elements defining the boxes on a W-2 form are nearly constant compared to the variation seen across the text values within the boxes. Thus, the spectral domain representation from the 2D DFT allows the text and form elements to be identified and grouped together by frequency.

Figure 3:
FIG. 3 is a block diagram illustrating an example form image preprocessing agent, according to one embodiment.

FIG. 3 illustrates an example preprocessing agent, according to one embodiment. As shown, form preprocessing agent 200 includes an image manager 300, a spectral analysis agent 310, and a filter agent 320. The image manager 300 receives images sent to the image processing agent 110 and provides the images to the spectral analysis agent 310. For example, as part of a tax preparation process available to users over the internet, image processing agent 110 receives images the user's tax forms. In order for the tax preparation process to compute the user's tax, the system must extract the text elements from the image and provide context for the elements to define what they represent, i.e., is an extracted text element of "$10,000" the amount of wages or taxes withheld? Form preprocessing agent 200 removes the text elements from the form image by creating a spectral representation of the image that can be filtered to remove the text. The resulting "empty" form is provided to form classification agent 210 for matching, while a text image is provided to OCR agent 220 to extract text elements.

In one embodiment, spectral analysis agent 310 prepares the image for filtering and generates reconstructed images after filtering. For example, the spectral analysis agent 310 calculates the 2D DFT to create a spectral domain representation used by filter agent 320 to separate the text element and form elements in the image. Spectral analysis agent 310 receives filtered spectral domain representations from filter agent 320 generates reconstructed images by calculating a reverse transformation.

Figures 4A, 4B:
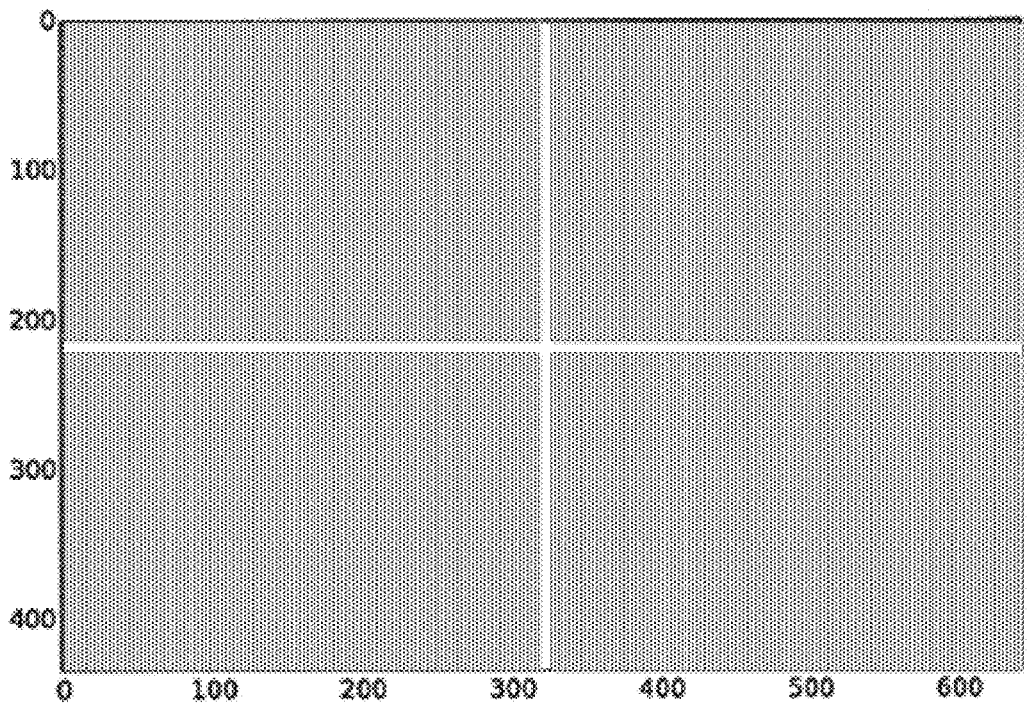
FIG. 4A is an example of a form image, according to one embodiment.
FIG. 4B is a graph illustrating a frequency decomposition of a signal representation of a form image, according to one embodiment.

In an embodiment, the spectral analysis agent 310 applies a 2D DFT, $S_{kl}$, for a 2D spatial signal $s_{pq}$, represented as:

$$S_{kl} = \frac{1}{MN} \sum_{p=0}^{M-1} \sum_{q=0}^{N-1} s_{pq} e^{-i2\pi pk/M} e^{-i2\pi ql/N}$$

where $s_{pq}$ represents the gray-scale value of the image pixel at coordinate (p,q). For example, FIG. 4A illustrates a form image including form layout elements and text elements and FIG. 4B illustrates a spectral domain representation of the form image shown in FIG. 4A. As shown in FIG. 4B, the spectral domain representation of the form from FIG. 4A generally depicts a well-defined horizontal line at the midpoint of the y-axis and a well-defined vertical line at the midpoint of the x-axis. These two lines, forming a cross shape, define the low frequency form layout elements from the image in FIG. 4A. After generating the spectral domain representation of the form image, spectral analysis agent 310 provides the spectral domain representation to filter agent 320.

Filter agent 320 removes text elements from the form image by applying a filter to the spectral domain representation generated by the spectral analysis agent 310. The filter identifies the high frequency elements of the spectral domain representation that are treated as text elements. By filtering the high frequency elements from the spectral domain representation, the text elements are removed, while the lower frequency elements representing the form layout elements are preserved.

In one embodiment, filter agent 320 removes text elements using a 2D low-pass filter, $L_{kl}$ including frequencies in a narrow k and l band, be represented as:

$$L_{kl} = \left(|k| \leq \frac{B_x}{2}\right) \cup \left(|l| \leq \frac{B_y}{2}\right)$$

Figure 5A:
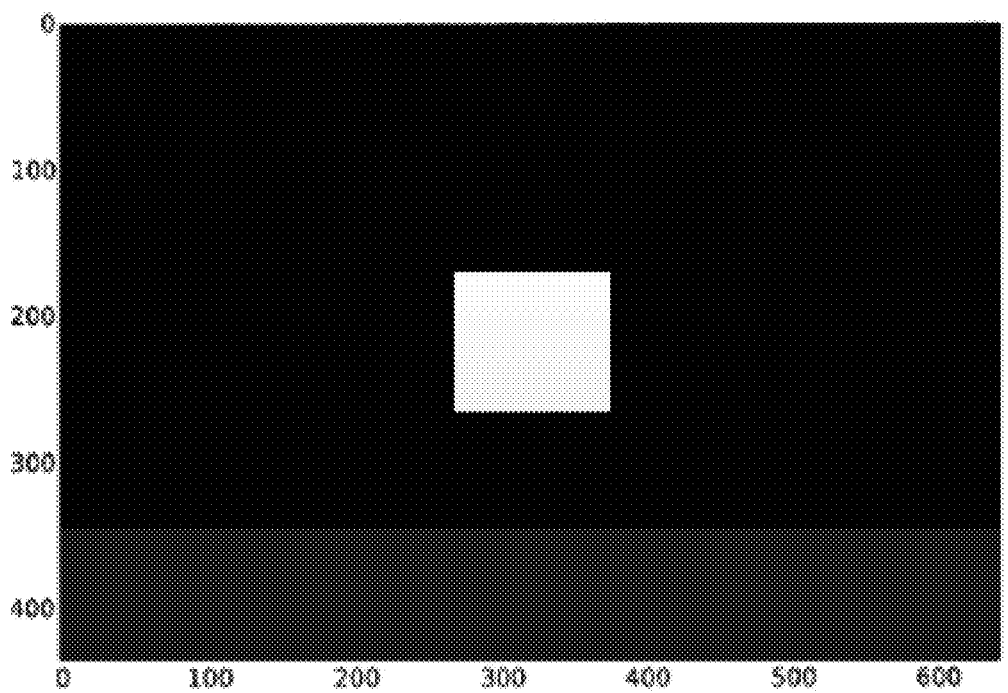
FIG. 5A is a graph illustrating an intersection filter effect on a frequency domain representation of an image, according to one embodiment.
Figure 5B:
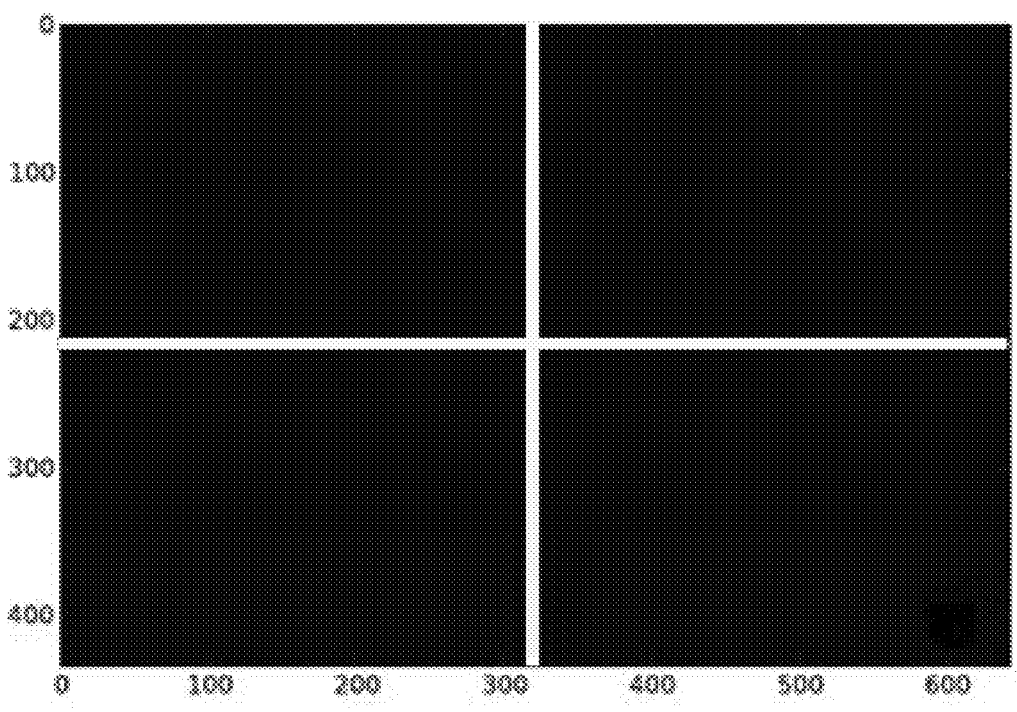
FIG. 5B is a graph illustrating a union filter effect on a frequency domain representation of an image, according to one embodiment.

2D low-pass filters use an intersection operator (∩) in the construction of the filter. That is, only elements with a low frequency in both the X and Y directions are preserved with the intersection operation. However, restricting the filter to only those elements with low frequencies in both dimensions leads to the loss of high frequency elements that contribute to the form layout in addition to text, which degrades the ability to reconstruction the form. FIG. 5A illustrates an example of a 2D filter using an intersection operator applied to the spectral domain representation shown in FIG. 4A. As shown, the intersection filter allows in a circular or rectangular frequency space to remain, but the passing frequencies have low frequencies in both the X and Y directions. FIG. 5B illustrates and example 2D filter using a union operator applied to the spectral domain representation shown in FIG. 4A. As shown, the union allows the filter to be tailored limit the frequency component for one dimension while allowing high frequency for the other dimension. That is, FIG. 5B illustrates a very low frequency for threshold for both the X and Y axes, but the union operator allow any component with a X frequency below the threshold to pass, and any frequency below the Y threshold to pass, regardless of the components frequency in the other direction (Y and X, respectively). The shape of the 2D filter effects how well the form layout elements are maintained, where the filter shape shown in FIG. 5B (preserving the elements with low frequency in one of the two dimensions) may more accurately identify and preserve layout elements.

Figure 5C:
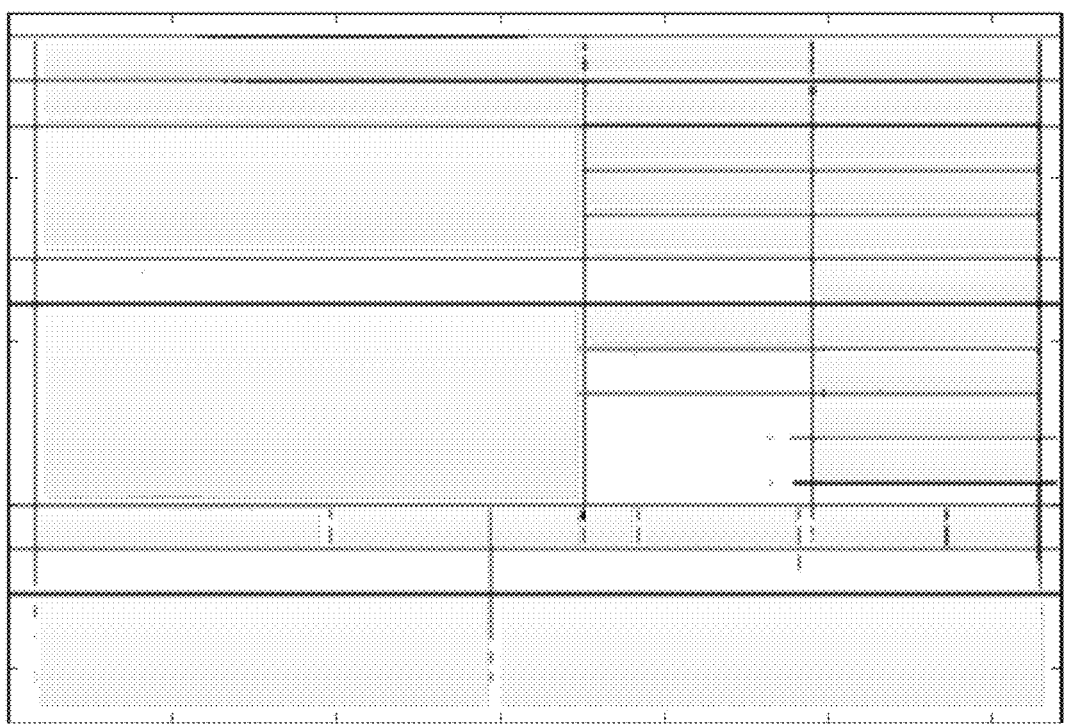
FIG. 5C is an example of a reconstructed form, according to one embodiment.

In one embodiment, spectral analysis agent 310 creates a reconstructed form image from the filtered spectral domain representation using an inverse transformation. That is, spectral analysis agent 310 calculates an inverse 2D DFT transform to generate an image from the spectral domain representation. FIG. 5C illustrates an example of a reconstructed form image from the filtered spectral domain representation in FIG. 5B. A reconstructed image generated from a low-pass filtered spectral domain representation contains the form elements with the text elements removed. A reconstructed image generated from a high-pass filtered spectral domain representation contains the text elements with the form elements removed. In one embodiment, spectral analysis agent 310 creates the reconstructed image, $s'_{pq}$ using the inverse transformation:

$$s'_{pq} = \sum_{k=0}^{M-1} \sum_{l=0}^{N-1} S_{kl} e^{i2\pi pk/M} e^{i2\pi ql/N}$$

Form preprocessing agent 200 sends reconstructed form images to the form classification agent 210 and reconstructed text images to OCR agent 220 by image manager 300.

In an embodiment, image manager 300 subdivides images received by the preprocessing agent 200 into a plurality of sub-images. Each such sub-image may be submitted to the spectral analysis agent 310. Spectral analysis agent 310 generates a spectral domain representation for each sub-image and filter agent 320 applies a filter to each sub-image spectral domain representation. Filter agent 320 can apply different filters to some or all of the sub-image spectral domain representations to improve clarity of the form elements in reconstructed form images generated from the sub-image spectral domains. Image manager 300 combines the reconstructed form images generated from the sub-images to create a reconstructed composite form image of the original image.

Form classification agent 210 is configured to match the layout in the reconstructed form image to a known form template from the form template database 120 using machine learning engine. Form classification agent 210 receives the reconstructed form image from image manager 300 and attempts to match the form layout depicted in the reconstructed form image to a known form layout. For example, form classification agent 210 may match the reconstructed form image to a known form layout using a variety of machine learning approaches, e.g., a neural network analysis of the reconstructed form image. In using a classification approach, machine learning engine is trained using form layouts from the form template database 120, which includes form templates and classification data for the fields and or boxes of the form. If form classification agent 210 cannot match the form image to a form template using the machine learning algorithm, form classification agent 210 can mark the reconstructed form image for human review and classification.

However, in cases where human review of a form is needed, the reconstructed form image does not contain any personal identifying information because the text elements have been removed. Thus, when the system encounters a form image with a new form layout that could require human classification, such as a new W-2 from an employer, the sensitive personal information in the form, such as social security number and earnings, will have been removed. In an embodiment, human review of reconstructed form images are necessary to establish a training set for the machine learning algorithm or for human classification of forms when the machine learning cannot identify a match.

OCR agent 220 identifies text elements for the form image by analyzing the reconstructed text image. OCR agent 220 processes the reconstructed text image using an optical character recognition algorithm configured to detect and text elements in the reconstructed text image and generate text from the content of the image. The text elements may be stored in database 140 and searched by application server 130. The digital text elements generated by OCR agent 220 are provided to image processing agent 110, which uses the classification result from the form classification agent 210 to map the text elements onto the appropriate boxes of the form template. That is, the mapping provides context to identify what the text elements represent, i.e., "$10,000" of wages and tips vs. taxes withheld for a W-2. Image processing agent 110 stores the text elements in database 140 in fields corresponding to the context provided by the classification agent 210 mapping.

FIG. 6 illustrates a process for removing text from form images, according to one embodiment. As shown, the process 600 begins at step 610 with the image processing agent 110 receiving a form image. For example, the image processing agent 110 would receive an image of a W-2 from user of an online tax preparation website, and the image of the W-2 would enter process 600 at step 610. At step 620, a spectral analysis agent of the preprocessing agent performs a spectral decomposition of the form image. Doing so results in a spectral or frequency domain representation. As noted, this representation allows high frequency components corresponding to text elements to be separated from low frequency components corresponding to form layout elements by filtering the frequencies.

At step 630, filter agent may remove the text elements from the spectral domain representation. For example, the filter agent may apply a 2D low-pass filter to remove high frequency elements associated with text. Further, in some embodiments, filter agent may generate a separate spectral domain representation by applying a 2D high-pass filter to remove the form layout elements from the spectral domain representation. In step 640, form preprocessing agent applies an inverse transformation to the low-pass filtered spectral domain representation to create a reconstructed form image containing the form layout elements with the text elements removed. At step 650, preprocessing agent applies an inverse transformation to the high-pass filtered spectral domain representation to create a reconstructed text image with the form elements removed.

At step 660, form classification agent analyzes the reconstructed form image and matches it to a known form template from form template database. At step 670, OCR agent generates text elements by applying an optical character recognition process to the reconstructed text image. At step 680, the image processing agent maps the text elements generated by OCR agent onto a form template identified by the form classification agent. The mapping provides context for the text elements that is needed to store the text elements in the appropriate fields in a database. Image processing agent stores the digital text elements in database in the field each digital text element is mapped into.

Figure 7:
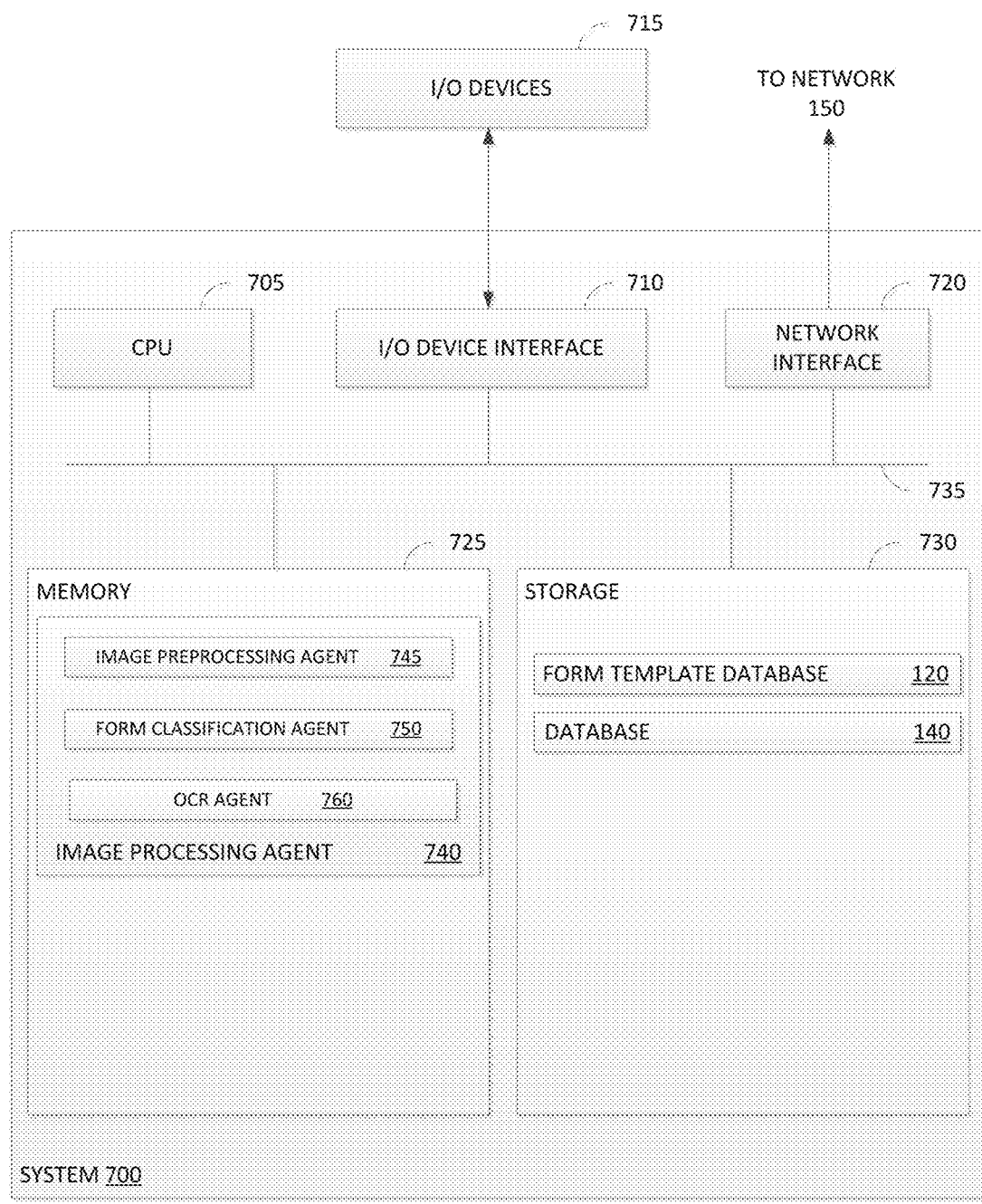
FIG. 7 illustrates an example computing system for processing a form image, according to one embodiment.

FIG. 7 illustrates an example computing system for processing a form image. As shown, the system 700 includes, without limitation, a central processing unit (CPU) 705, one or more I/O device interfaces 710 which may allow for the connection of various I/O devices 715 (e.g. keyboards, displays, mouse devices, pen inputs, etc.) to the system 700, network interface 720, a memory 725, storage 730, and an interconnect 735.

CPU 705 may retrieve and execute programming instructions stored in the memory 725. Similarly, the CPU 705 may retrieve and store application data residing in memory 725. The interconnect 735, transmits programming instructions and application data, among the CPU 705, I/O device interface 710, network interface 720, memory 725, and storage 730. CPU 705 is included to be representative of a single CPU, multiple CPUs, a single CPU having multiple processing cores, and the like. Additionally, the memory 725 is included to be representative of a random access memory. Furthermore, the storage 730 may be a disk drive, solid state drive, or a collection of storage devices distributed across multiple storage systems. Although shown as a single unit, the storage 730 may be a combination of fixed and/or removable storage devices, such as fixed disc drives, removable memory cards or optical storage, network attached storage (NAS), or a storage area-network (SAN).

As shown, memory 725 includes image processing agent 740 including an image preprocessing agent 745, a form classification agent 750, and an OCR agent 760. Image preprocessing agent 745 is generally configured to process form images received via network 150 or I/O devices 715. Image preprocessing agent 745 is configured to remove the text elements from the form image by performing a spectral decomposition using a 2D DFT to create a spectral domain representation of the form image. Image preprocessing agent 745 filters the spectral domain representation by applying a 2D low-pass filter to create a low-pass filtered spectral domain representation with the text elements removed. The image preprocessing agent separately applies a 2D high-pass filter to the spectral domain representation to create a high-pass filtered spectral domain representation with the form layout elements removed. Image preprocessing agent 745 applies an inverse 2D DFT to the low-pass filtered spectral domain representation to create a reconstructed form image, and applies an inverse 2D DFT to the high-pass filtered spectral domain representation to create a reconstructed text image. Image preprocessing agent 745 provides the reconstructed form image to form classification agent 750 and the reconstructed text image to OCR agent 760.

Form classification agent 750 is configured to match the reconstructed form image to a known form template. Form classification agent 750 uses a machine learning algorithm to match the reconstructed form image to a known form template. The machine learning algorithm uses a collection of known form templates stored in form template database 120 maintained in storage 730, as shown, or alternatively, accessible via network 150. In an embodiment, the machine learning algorithm is a neural network configured to match form images. Form classification agent 750 provides the matching form template to image preprocessing agent 745.

OCR agent 760 is configured to generate text elements from the reconstructed text image. OCR agent 760 uses an optical character recognition algorithm to generate a text element corresponding to each text section depicted in the reconstructed text image. OCR agent 760 provides the text elements to image preprocessing agent 745.

Image preprocessing agent 745 maps the text elements onto the field and box elements in the form template to provide context for the text elements. Image preprocessing agent 745 stores the text elements in database 140 as data in the field each text element is mapped into. Database 140 is maintained in storage 730, as shown, or alternatively, is accessible via network 150. Once the text elements are stored in their respective fields in database 140, the information is available for use by other applications through network 150.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for removing text from form images comprising:
    generating a frequency domain representation of an image by applying a two dimensional frequency domain transformation to the image, wherein the image depicts at least a portion of a form and wherein the form includes layout elements and text elements;
    removing a portion of the frequency domain representation that represents the text elements by applying a first filter to the frequency domain representation, producing a first filtered frequency domain representation;
    generating a reconstructed image of at least the portion of the form by applying an inverse two dimensional frequency domain transformation to the first filtered frequency domain representation, wherein the reconstructed image does not depict the text elements;
    removing a portion of the frequency domain representation that represents the layout elements by applying a layout filler to the frequency domain representation, producing a second filtered frequency domain representation;
    generating a reconstructed text image by applying an inverse two dimensional frequency domain transformation to the second filtered frequency domain representation, wherein the reconstructed text image does not depict the layout elements;

matching the reconstructed image to a form template;

generating text from the reconstructed text image; and mapping a portion of the text to a corresponding field of the form template based on a position of the portion of the text in the reconstructed text image.

2. The method of claim 1, wherein the reconstructed image is matched to the form template using a neural network.

3. The method of claim 1, wherein the layout filter comprises a two dimensional high-pass filter.

4. A system, comprising:

a processor; and memory storing instructions which, when executed on the processor, operate to remove text from form images, the operation comprising:

generating a frequency domain representation of an image by applying a two dimensional frequency domain transformation to the image, wherein the image depicts at least a portion of a form and wherein the form includes layout elements and text elements;

removing a portion of the frequency domain representation that represents the text elements by applying a first filter to the frequency domain representation, producing a first filtered frequency domain representation;

generating a reconstructed image of at least the portion of the form by applying an inverse two dimensional frequency domain transformation to the first filtered frequency domain representation, wherein the reconstructed image does not depict the text elements;

removing a portion of the frequency domain representation that represents the layout elements by applying a layout filter to the frequency domain representation, producing a second filtered frequency domain representation;

generating a reconstructed text image by applying an inverse two dimensional frequency domain transformation to the second filtered frequency domain representation, wherein the reconstructed text image does not depict the layout elements;

matching the reconstructed image to a form template;

generating text from the reconstituted text image; and mapping a portion of the text to a corresponding field of the form template based on a position of the portion of the text in the reconstructed text image.

5. The system of claim 4, wherein the reconstructed image is matched to the form template using a neural network.

6. The system of claim 4, wherein the layout filter comprises a two dimensional high-pass filter.

7. A non-transitory computer-readable medium comprising instructions which, when executed by one or more processors, performs an operation for removing text from form images, the operation comprising:

generating a frequency domain representation of an image by applying a two dimensional frequency domain transformation to the image, wherein the image depicts at least a portion of a form and wherein the form includes layout elements and text elements;

removing a portion of the frequency domain representation that represents the text elements by applying a first filter to the frequency domain representation, producing a first filtered frequency domain representation;

generating a reconstructed image of at least the portion of the form by applying an inverse two dimensional frequency domain transformation to the first filtered frequency domain representation, wherein the reconstructed image does not depict the text elements;

removing a portion of the frequency domain representation that represents the layout elements by applying a layout filter to the frequency domain representation, producing a second filtered frequency domain representation;

generating a reconstructed text image by applying an inverse two dimensional frequency domain transformation to the second filtered frequency domain representation, wherein the reconstructed text image does not depict the layout elements;

matching the reconstructed image to a form template;

generating text from the reconstructed text image; and mapping a portion of the text to a corresponding field of the form template based on a position of the portion of the text in the reconstructed text image.

8. The non-transitory computer-readable medium of claim 7, wherein the operation further comprises:

upon determining an amount of layout elements is below a threshold, adjusting the portion of the frequency domain removed by modifying the filter; and generating a modified reconstructed image by applying an inverse two dimensional frequency domain transformation to the frequency domain representation after being filtered with the modified filter.

9. The non-transitory computer-readable medium of claim 8, wherein the operation further comprises:

generating a frequency domain representation of a second image by applying a two dimensional frequency domain transformation, wherein the second image depicts at least a second portion of the form;

removing a portion of the frequency domain representation representing the text elements of the second image by applying a second filter to the frequency domain representation of the second image, producing a filtered frequency domain representation of the second image; and generating a reconstructed second image by applying an inverse two-dimensional frequency domain transformation to the filtered frequency domain representation of the second image, wherein the text element is not depicted in the reconstructed image; and generating a composite form image by combining the reconstructed image and the reconstructed second image.

10. The non-transitory computer-readable medium of claim 7, wherein the reconstructed image is matched to the form template using a neural network.

11. The non-transitory computer-readable medium of claim 7, wherein the layout filter comprises a two dimensional high-pass filter.

12. The non-transitory computer-readable medium of claim 7, wherein the two dimensional frequency domain transformation applied to the image is a two dimensional discrete Fourier transform.

\* \* \* \* \*